(12) United States Patent
Babu Padamati et al.

(10) Patent No.: US 11,992,024 B2
(45) Date of Patent: May 28, 2024

(54) METHOD OF PRODUCING A LOW-LACTOSE MILK PROTEIN ISOLATE

(71) Applicant: The Provost, Fellows, Scholars and Other Members of Board of Trinity College Dublin, Dublin (IE)

(72) Inventors: Ramesh Babu Padamati, Dublin (IE); Mukesh Prabhakar Pednekar, Dublin (IE)

(73) Assignee: The Provost, Fellows, Scholars and Other Members of Board of Trinity College Dublin, Dublin (IE)

( * ) Notice: Subject to any disclaimer, the term of this patent is extended or adjusted under 35 U.S.C. 154(b) by 0 days.

(21) Appl. No.: 17/846,600

(22) Filed: Jun. 22, 2022

(65) Prior Publication Data

US 2023/0413839 A1    Dec. 28, 2023

(51) Int. Cl.
  A23C 9/15    (2006.01)
  A23C 9/142   (2006.01)
  A23C 9/16    (2006.01)
  A23J 1/20    (2006.01)

(52) U.S. Cl.
  CPC .......... *A23C 9/1512* (2013.01); *A23C 9/1422* (2013.01); *A23C 9/16* (2013.01); *A23J 1/20* (2013.01)

(58) Field of Classification Search
  CPC ....... A23C 9/1512; A23C 9/1422; A23C 9/16; A23J 1/20
  USPC .......................................................... 426/74
  See application file for complete search history.

(56) References Cited

U.S. PATENT DOCUMENTS

2004/0224069 A1* 11/2004 Aird .................. A23C 9/1542
                                                    426/582

* cited by examiner

*Primary Examiner* — Brent T O'Hern
(74) *Attorney, Agent, or Firm* — Morse, Barnes-Brown & Pendleton, P.C.; Martin Z. Zhang

(57) ABSTRACT

A method of producing a low-lactose milk protein concentrate comprising the steps of providing a starting liquid milk protein concentrate, pre-treating the milk protein concentration by ultra-sonication, and treating the pre-treated milk protein concentration by diafiltration to provide a calcium depleted low-lactose milk protein concentrate. The process of the invention provides a milk protein concentrate with high levels of protein, less than 1% lactose, and a calcium level that is depleted by at least 20% compared with an untreated milk protein concentrate.

13 Claims, 3 Drawing Sheets

US 11,992,024 B2

METHOD OF PRODUCING A LOW-LACTOSE MILK PROTEIN ISOLATE

FIELD OF THE INVENTION

The present invention relates to a method of producing a low-lactose milk protein isolate.

BACKGROUND TO THE INVENTION

Milk protein concentrate (MPC) and Milk protein isolates (MPI) are high protein products produced from skimmed milk. They are widely used in different food products based on their protein content and purity. The common applications include desserts, baked foods, toppings, low fat spreads, dairy-based beverages, texture improvement in yogurts and nutritional drinks. The composition of protein, lactose, calcium and other minerals dictates the use of MPC in various applications.

Currently MPC and MPI are produced using continuous membrane separation process followed by diafiltration to obtain various grades of MPC and MPI. MPI has a higher protein concentration than MPC (generally 85% or more protein "as is"), and a lower level of lactose. See FIG. 1A. However, the level of calcium and lactose in conventional MPC and MPI inhibits the use in niche applications such as clinical products, infant formula and sports market.

Current methods of producing low-lactose MPI's generally involve use of enzymes (U.S. Pat. No. 8,986,768), which are undesirable due to the generation of additional compounds such as glucose and galactose from enzymatic breakdown of lactose, and ion-exchange resins (EP2068646) which are undesirable due to the leaching of ions from the resins which end up in the product.

It is an object of the invention to overcome at least one of the above-referenced problems.

SUMMARY OF THE INVENTION

The Applicant has addressed the problems of the prior art by providing a process for producing a low-lactose milk concentrate (for example, a low-lactose milk protein isolate; MPI) from a milk concentrate (for example, a milk protein concentrate; MPC) that comprises treating the substrate to ultra-sonication followed by diafiltration. The method successfully reduces the level of lactose in the product to less than 0.51% (% dry matter [DM]) and, in addition, significantly reduces the calcium levels in the product. This is illustrated in Table 3 and Table 4 where the low-lactose MPI produced according to the method of the invention has more than 20% depletion in calcium compared to the starting MPC substrate, less than 1% lactose (% DM), and in some cases a higher protein concentration. As compared to existing solutions, this is a simple process that obviates the requirement of enzymatic and ion-exchange methodologies.

In a first aspect, the invention provides a method of producing a low-lactose milk protein concentrate comprising the steps of:
providing a starting liquid milk protein concentrate;
pre-treating the milk protein concentrate by ultra-sonication; and
treating the pre-treated milk protein concentrate by diafiltration to provide a low-lactose calcium-depleted milk protein concentrate.

In another aspect, the invention provides a method of calcium depletion of a milk product, for example a milk concentrate, comprising pre-treating the milk product by ultra-sonication, and treating the pre-treated milk product by diafiltration to provide a calcium depleted milk product.

In one embodiment, the liquid milk protein concentrate is obtained by ultrafiltration (UF) followed by diafiltration and optionally has a degree of diafiltration of 70-120%, 75-110% or 80-105%.

In one embodiment, the liquid milk protein concentrate comprises 40-90% protein, 60-90% protein, 70-90% protein, or 80-90% protein (% DM).

In one embodiment, the liquid milk protein concentrate comprises 1-6% lactose, 2-6% lactose, 3-6% lactose, or 4-6% lactose (% DM).

In one embodiment, the liquid milk protein concentrate comprises 2.3-4% calcium (% DM). In one embodiment, the method produces a product that is depleted in calcium compared with the substrate by at least 10%, 15%, 20% or 25% (% DM).

In one embodiment, the liquid milk protein concentrate substrate comprises at 70-87% protein, 1-6% lactose, and 2.3-4% calcium (% DM).

In one embodiment, the low-lactose milk protein concentrate produced by the method of the invention comprises less than 0.55% lactose (% DM).

In one embodiment, the low-lactose milk protein concentrate produced by the method of the invention comprises less than 0.50% lactose (% DM).

In one embodiment, the low-lactose milk protein isolate produced by the method of the invention comprises less than 0.55% lactose (% DM).

In one embodiment, the low-lactose milk protein concentrate produced by the method of the invention comprises more than 90% protein (% DM).

In one embodiment, the low-lactose milk protein concentrate produced by the method of the invention comprises less than 2% calcium (% DM).

In one embodiment, the pre-treated milk protein concentrate is treated by diafiltration to a degree of at least 80, 90, 100, 105, 110, or 115% DF.

In one embodiment, the diafiltration step employs soft water or a dilute salt solution as a diafiltration media.

In one embodiment, the dilute salt solution has a salt concentration of 0.075-0.150M salt solution.

In one embodiment, the method comprises a step of drying the low-lactose milk protein concentrate to a powder. Various drying methods may be used to dry the concentrate, including spray-drying, fluidised bed drying, vacuum drum drying, and evaporation.

In another aspect, the invention provides a low-lactose milk protein concentrate obtained a method of the invention.

In another aspect, the invention provides composition comprising a low-lactose milk protein concentrate obtained according to the invention. The composition is generally a comestible composition, for example a food product, beverage, infant formula, a food for special medical purpose (FSMP), or nutritional supplement.

In another aspect, the invention provides an infant formula comprising a low-lactose milk protein concentrate according to, or obtained according to a method of, the invention.

Other aspects and preferred embodiments of the invention are defined and described in the other claims set out below.

DETAILED DESCRIPTION OF THE INVENTION

Figure 1A:
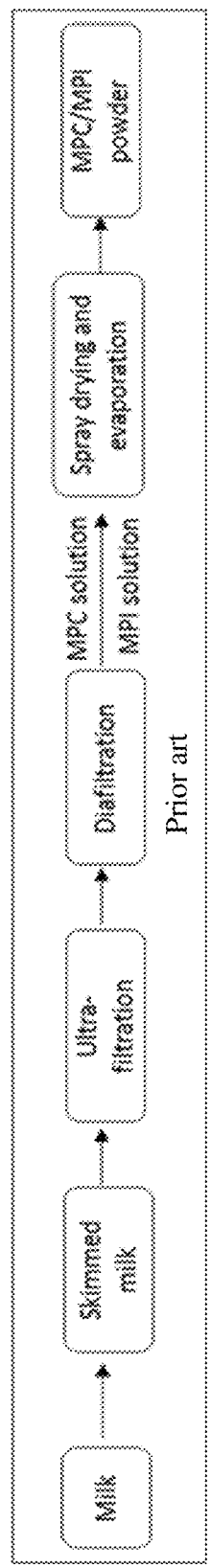
FIG. 1A (Comparative): Conventional process for the preparation of MPC/MPI powder from milk.
Figure 1B:
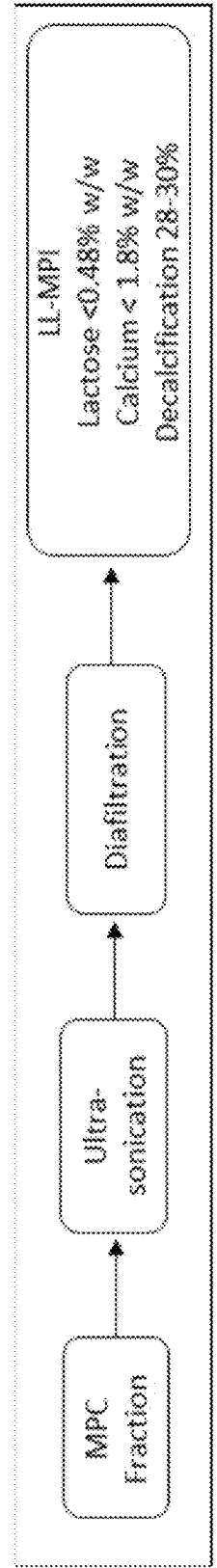
FIG. 1B: Process according to the invention involving ultra-sonication and membrane process.

All publications, patents, patent applications and other references mentioned herein are hereby incorporated by reference in their entireties for all purposes as if each individual publication, patent or patent application were specifically and individually indicated to be incorporated by reference and the content thereof recited in full.

Definitions and General Preferences

Where used herein and unless specifically indicated otherwise, the following terms are intended to have the following meanings in addition to any broader (or narrower) meanings the terms might enjoy in the art:

Unless otherwise required by context, the use herein of the singular is to be read to include the plural and vice versa. The term "a" or "an" used in relation to an entity is to be read to refer to one or more of that entity. As such, the terms "a" (or "an"), "one or more," and "at least one" are used interchangeably herein.

As used herein, the term "comprise," or variations thereof such as "comprises" or "comprising," are to be read to indicate the inclusion of any recited integer (e.g. a feature, element, characteristic, property, method/process step or limitation) or group of integers (e.g. features, element, characteristics, properties, method/process steps or limitations) but not the exclusion of any other integer or group of integers. Thus, as used herein the term "comprising" is inclusive or open-ended and does not exclude additional, unrecited integers or method/process steps.

As used herein, the term "milk protein concentrate" or "MPC" should be understood to mean skimmed milk concentrate that has been concentrated generally by a membrane filtration process to a protein level of up to 90% and typically 40-89% milk protein (% DM) and contains more than 1% lactose (% DM), generally 1-6% or 2-6% lactose depending on the method of manufacturing. Generally, it is produced by ultrafiltration optionally combined with diafiltration. The casein and whey proteins are generally present in the same ratio as found in unprocessed skimmed milk.

As used herein, the term "milk protein isolates" or "MPI" should be understood to mean high purity protein product produced from milk protein concentrate (MPC) by diafiltration and that contains at least 85% (% DM) protein. In one embodiment a milk protein isolate is a skimmed milk protein concentrate produced by membrane filtration process that contains higher protein content and less than 2% lactose (% DM) as compared to milk protein concentrate. The milk protein isolate has been prepared by membrane process involving high degree of diafiltration. In this case diafiltration of MPC is performed in the range of 120-190% DF and preferably about 150-180% DF.

The substrate of the method of the invention may be a milk protein concentrate and the product may be a milk protein isolate. The term "milk protein concentrate with at least 80% DF" or "MPC with at least 80% DF" indicates milk protein concentrate fraction obtained after diafiltration is performed to a level of at least 80% DF.

As used herein, the term "low-lactose" as applied to milk protein isolates produced by the method of the invention should be understood to mean a lactose concentration of less than 1% (% DM), and preferably less than 0.7%, 0.6%, 0.55% or lactose (% DM).

As used herein, the term "calcium depleted" as applied to a low-lactose milk protein isolates means a milk protein isolates that has a calcium level that is depleted compared with the starting milk protein concentrate, and generally depleted by at least 10%, 15%, 20% or 25% (% DM). In one embodiment, the calcium depleted milk protein isolates has less than 2% calcium (% DM).

As used herein, the term "ultra-sonication" should be understood to mean the application of sound energy of ultrasonic frequency (about 20 KHz or higher) to a liquid to breakdown particles in the liquid by means of cavitation effect. In the present case, the purpose of the ultra-sonication step is to disrupt casein micelles in the MPC and release calcium phosphate which is then removed in the subsequent diafiltration step. Ultra-sonication may be performed at 50-100% amplitude, preferably about 100% amplitude. Generally, a plurality of ultra-sonication steps are performed on the MPC. In one embodiment, the ultra-sonication step employs an ultra-sonicator system—such systems are supplied by Hielscher-Ultrasound Technology; Model: UIP1500 hdT.

As used herein, the term "diafiltration" should be understood to mean a process involving ultrafiltration membrane to washing out low molecular weight components (in this case lactose and minerals) in the membrane retentate (in this case MPC and ultrasonicated MPC) by addition of water or DF media into a retentate and removal of permeate from the membrane. The diafiltration is the washing process that involves addition of DF media into substrate and subsequent removal of DF media through membrane that leads to depletion of components other than the product depending on the membrane pore size.

Figure 3:
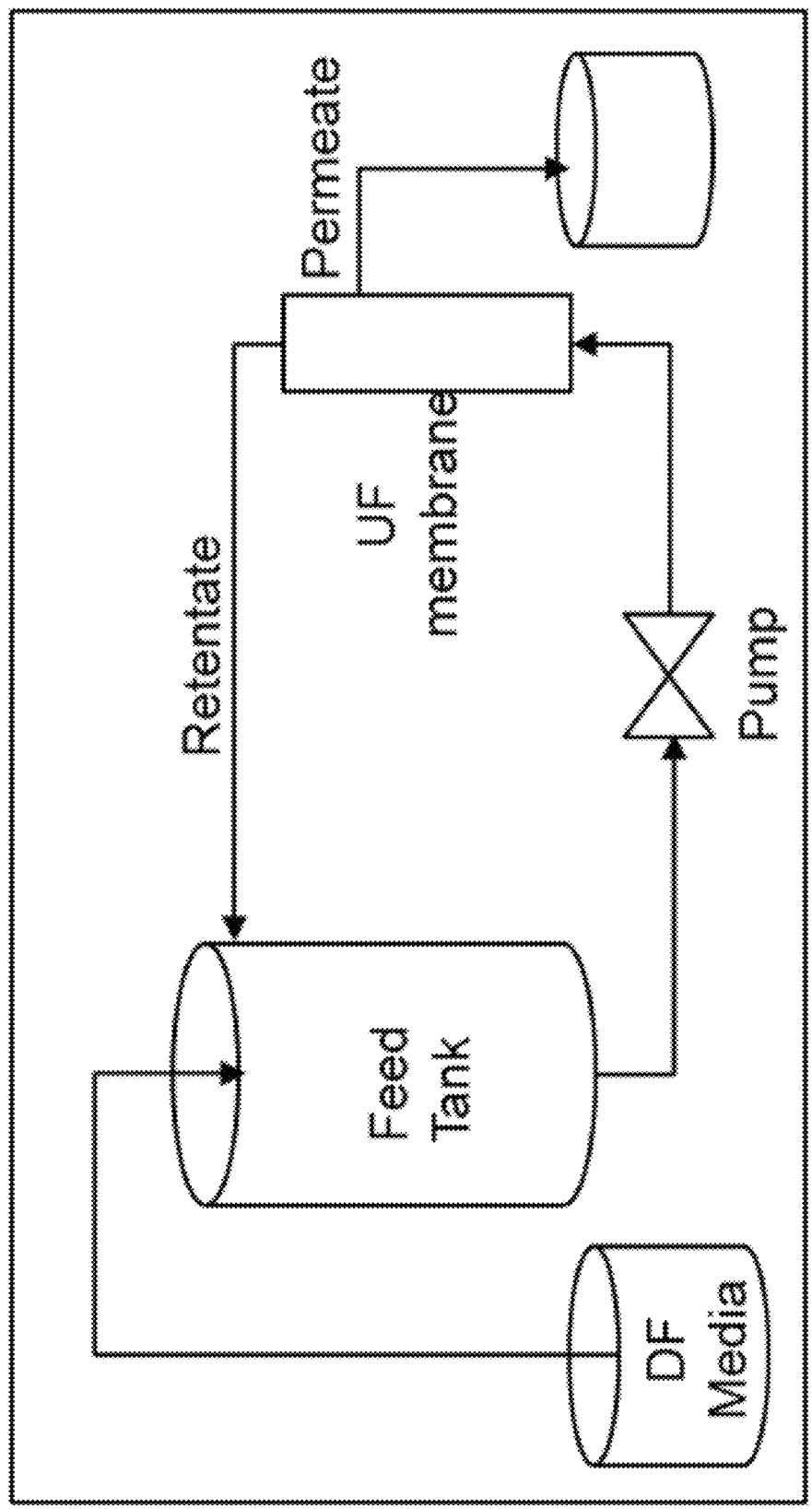
FIG. 3: Schematic representation of continuous diafiltration.

The diafiltration process may be a batch or continuous process. An example of a system for performing continuous diafiltration is illustrated in FIG. 3. The diafiltration (DF) media may preferably be water, preferably soft water or a dilute salt solution. At the start of the process, the substrate (i.e. MPC and ultrasonicated MPC) is generally mixed with DF media, typically in a 1:1 volumetric ratio, and fresh DF media is preferably added to the UF retentate in a feed tank at a rate similar to UF permeate flow rate. In one embodiment, the diafiltration step is configured to achieve 170-190% DF. In one embodiment, the UF membrane has a molecular weight cut off (MWCO) of about 10,000 Da, although membranes with different MWCO may be employed. In a preferred embodiment, diafiltration is performed at below room temperature, typically about 12-18° C. and ideally about 15° C.

As used herein, the term "% DM" or "% dry matter" as applied to a component of a milk product should be understood to mean the amount of the component as a % of the dry matter in the milk product by weight. Thus, an MPC having 80% protein (% DM) means that when the MPC is dried to a powder, 80% by weight of the powder will be protein.

As used herein, the term "% DF" as applied to a MPC or MPI should be understood to mean the degree to which the MPC or MPI has been diafiltered as a %. DF % is calculated based on the volume of skimmed milk processed to prepare MPC fraction. It is calculated as per the following formula.

% DF=Volume of DF media utilized for DF×100/ Volume of skimmed milk

For instance, to achieve 180% DF of MPC fractions, the DF media is calculated as shown in the Table 1. The value of DF media is varies depending on the DF % of MPC fraction. For milk protein concentrate with 80% DF and milk protein concentrate with 105% DF (produced from 5× concentration of skimmed milk) the DF media 75 L and 56.25 L is required to obtain 180% DF.

TABLE 1

Calculation of DF media required to achieve 180% DF

| Skimmed milk (L) | MPC for trial (L) | DF media required for 180% DF (L) | Initial DF % of MPC fraction | DF media added for initial DF % of MPC (L) | DF media needs to be added (L) |
|---|---|---|---|---|---|
| 75 | 15 | 135 | 80 | 60 | 75 |
| 75 | 15 | 135 | 105 | 78.75 | 56.25 |

As used herein, the term "soft water" should be understood to mean containing less than 50 mg/L calcium carbonate.

As used herein, the term "dilute salt solution" should be understood to mean a 0.075-0.150M salt solution in which the salt is a generally a sodium or potassium salt (i.e. NaCl or KCl) that produces ions in solution capable of releasing calcium from the casein micelle.

Exemplification

The invention will now be described with reference to specific Examples. These are merely exemplary and for illustrative purposes only: they are not intended to be limiting in any way to the scope of the monopoly claimed or to the invention described. These examples constitute the best mode currently contemplated for practicing the invention.

Substrate

The composition of protein, lactose and calcium in the MPC starting substrate is shown in Table 2.

TABLE 2

The composition of the MPC fraction

| Components | Content in MPC fraction* |
|---|---|
| Total Solid (%) | 20 |
| Protein (% DM) | 84 |
| Lactose (% DM) | 4.2 |
| Calcium (% DM) | 2.7 |
| pH (pH Unit) | 6.65 |
| Conductivity (mS/cm) | 4.4 |
| Viscosity (cP at 20° C.)* | 89 |

*Values of components (%w/w) in MPC varies depending on the level of DF performed on MPC
**Viscosity measurement was performed using a Rheometer from TA Instrument, AR2000ex series with 40 mm 2 degree Aluminium cone geometry at shear rate $100s^{-1}$ at 20° C.

Ultra-Sonication and Diafiltration

The ultra-sonication system and membrane separation unit used for the development of innovative hybrid process is shown in FIG. 3. In the current process, milk protein concentrate (MPC with 80% DF and MPC with 105% DF) was first subjected to continuous ultra-sonication process using an ultra-sonicator system (Hielscher-Ultrasound Technology; Model: UIP1500 hdT, voltage: 230V, amplitude: 50 to 100%) with sonication frequency of 20 KHz and Power of 1500 W. The ultra-sonication pre-treatment of MPC was performed at 100% amplitude at the feed flow rate of 1 l/min. Four cycles of ultra-sonication treatment were performed at 100% amplitude and solution collected at end of 4th cycle labelled as ultra-sonicated MPC (US-MPC). For all trials, diafiltration was performed at 15° C. using Spectrum® Hollow fiber ultra-filtration module with membrane having MWCO of 10,000 Da and area of 1.25 $m^2$.

Figure 2B:
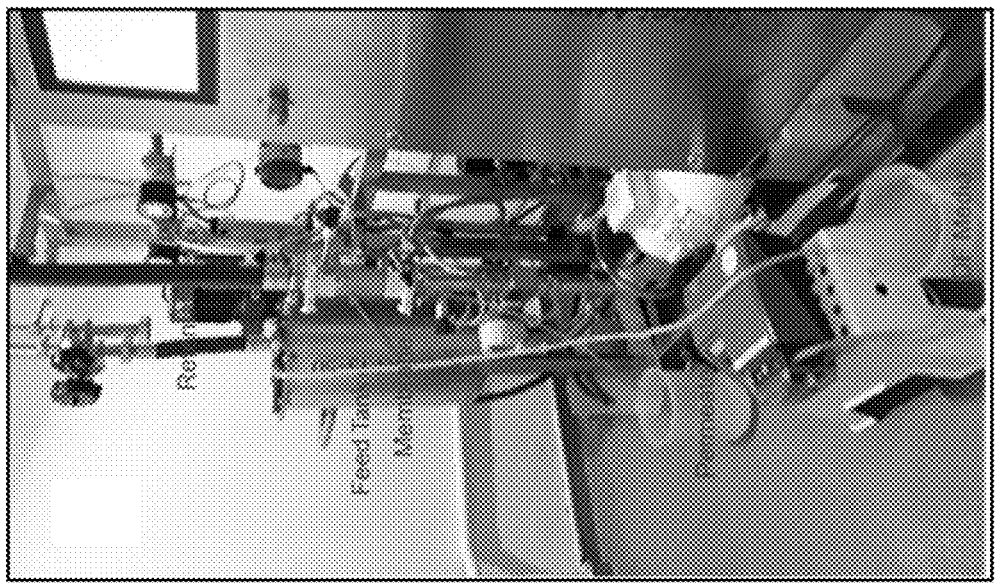
FIG. 2B: Set-up of continuous diafiltration system.
Figure 2A:
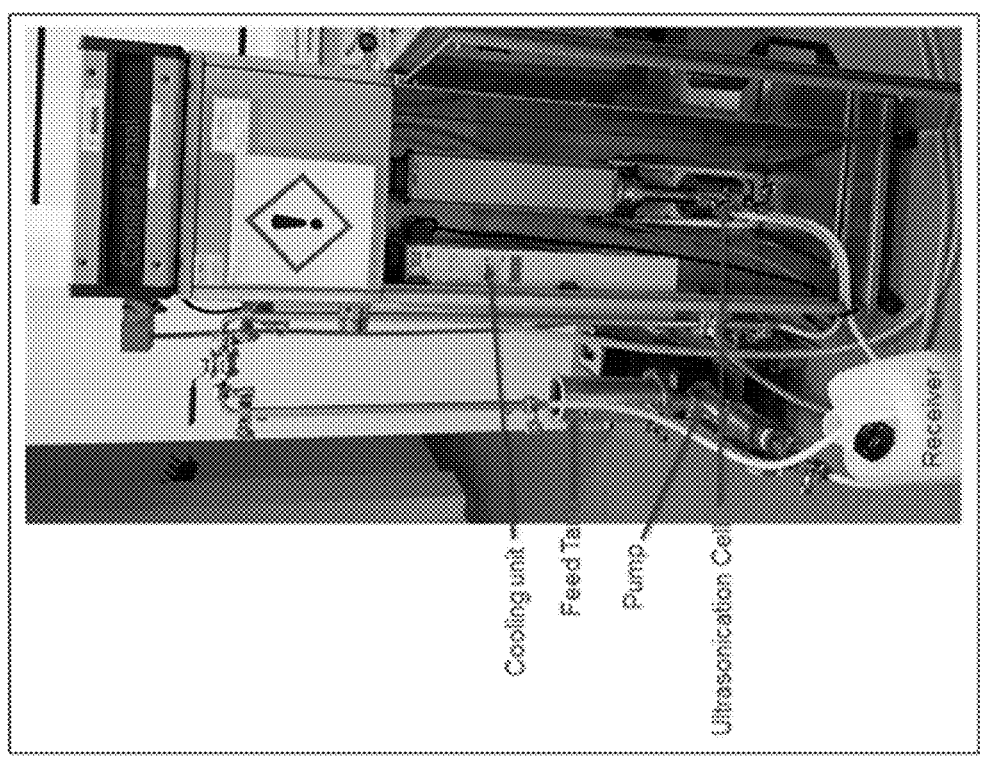
FIG. 2A: Set-up of ultra-sonication system

The ultra-sonication and diafiltration system is illustrated in FIGS. 2A and 2B. The continuous diafiltration process is illustrated in FIG. 3.

Example 1

Diafiltration of MPC Using Soft Water with and without Applying Ultra-Sonication The experiment was performed with liquid MPC sample of Table 2 that was subjected to 4-cylces of ultra-sonication treatment (amplitude 100%, sonication frequency: 20 KHz, temperature 15° C.). The MPC treated by ultra-sonication is referred to herein as US-MPC. First, Raw MPC sample (15 L) and US-MPC with 80% DF level (15 L) was introduced into a feed tank in separate trials. Then 15 L soft water (DF media) was added into each tank and mixed continuously at temperature of 15° C. In both trials, the mixture was fed onto ultra-filtration membrane (Spectrum® Hollow fiber module, MWCO Of 10,000 Da, 1.25 $m^2$ area) and diafiltration was conducted at 15° C. The membrane permeate was collected separately with simultaneous addition of soft water (60 L) to achieve DF level of 180%. The retentate stream was concentrated to achieve total solid content of 20% w/w basis. The membrane retentate i.e. MPI obtained from both trials were analysed for lactose and calcium content.

Example 2

Diafiltration of MPC Using Soft Water with and without Applying Ultra-Sonication The MPC sample (15 L) of Table 2 and ultra-sonication treated MPC (15 L) was introduced in a feed tank in separate experiment. The DF media i.e. sodium chloride solution (0.15M, 15 L) was added into each tank with continuous stirring at temperature maintained at 15° C. The mixture was then fed onto the ultra-filtration membrane with molecular weight cut-off 10,000 Da (Spectrum® Hollow fiber module with 1.2 $m^2$ area). The diafiltration was performed in a continuous mode with addition of DF media with simultaneous removal of permeate from membrane. The diafiltration was performed at 15° C. to achieve 180% DF level and total solid content level of 20% w/w. The membrane retentate samples from both trials, with and without ultra-sonication, were analysed for lactose and calcium content.

Results

The significance of ultra-sonication pre-treatment in the calcium depletion was prominently observed when diafiltration was performed with MPC as such and ultra-sonicated MPC. Table 3 indicated 2× increase in calcium removal with ultra-sonication assisted diafiltration. The ultra-sonication of MPC followed by diafiltration using soft water leads to 30.43% calcium removal as compared to that obtained with diafiltration trial without ultra-sonication treatment.

TABLE 3

Comparative evaluation of ultra-sonication effect on diafiltration of MPC using soft water as a diafiltration media

| Parameter | DF of MPC (DF 80%) with Soft water | | Ultra-sonication of MPC (DF80%) + DF using soft water | |
|---|---|---|---|---|
| | MPC | MPI (DF 180%) | US-MPC | MPI (DF 180%) |
| Total Solid (%) | 20.5 | 20.8 | 20.98 | 21.07 |
| pH (pH Unit) | 6.7 | 6.92 | 6.22 | 6.83 |
| Conductivity (mS/cm) | 4.44 | 1.09 | 4.44 | 0.502 |
| Protein (% DM) | 83.95 | 89.9 | 83.41 | 96.82 |
| Lactose (% DM) | 3.6 | <0.48 | 2.38 | <0.47 |
| Calcium (% DM) | 2.93 | 2.55 | 2.53 | 1.76 |
| Calcium removal (%) | — | 12.97 | — | 30.43 |

The diafiltration trials using dilute sodium chloride solution (0.15M) further confirms the importance of ultra-sonication in the calcium removal from MPC. The ultra-sonication pre-treatment prior to continuous diafiltration leads to 28.13% calcium removal which was 5 times higher than that obtained after diafiltration of MPC without ultra-sonication treatment. The composition of DF media also found to play a role in calcium removal. The diafiltration of ultra-sonicated MPC using soft water and salt solution produce 3× and 5×, respectively, higher calcium depletion than that obtained with their respective control diafiltration experiment involving no ultra-sonication pre-treatment. This attributed to combined action of ultra-sonication and ionic effect due to presence of salts in DF media that leads to release of calcium from protein micelles and further removal through the membrane separation process.

TABLE 4

Comparative evaluation of ultra-sonication effect on diafiltration of MPC using 0.15M sodium chloride as a diafiltration media

| Parameter | DF of MPC (DF 80%) with 0.15M Sodium chloride | | Ultra-sonication of MPC (DF80%) + DF using 0.15M Sodium chloride | |
|---|---|---|---|---|
| | MPC | MPI (DF 180%) | US-MPC | MPI (DF 180%) |
| Total Solid (%) | 18.45 | 20.25 | 18.7 2 | 20.7 |
| pH (pH Unit) | 6.64 | 6.78 | 6.65 | 6.74 |
| Conductivity (mS/cm) | 5.85 | 1.78 | 4.24 | 8.79 |
| Protein (% DM) | 87.26 | 84.44 | 86 | 87.4 |
| Lactose (% DM) | 1.08 | <0.49 | 0.53 | <0.48 |
| Calcium (% DM) | 2.66 | 2.52 | 2.56 | 1.84 |
| Calcium removal (%) | — | 5.26 | — | 28.13 |

The process of the invention involving ultra-sonication pre-treatment and membrane filtration leads to production of Low-Lactose MPI containing lactose less than 0.48% w/w and protein content more than 87% w/w, with the maximum of 96.82% w/w, with higher decalcification level. The maximum calcium removal was obtained (28 to 30%) by combining ultra-sonication pretreatment with membrane separation process and using DF media comprised of soft water and salt solution. This invention proposed the process to produce MPI with desired level of lactose and calcium in final protein product which can be varied depending on the application.

EQUIVALENTS

The foregoing description details presently preferred embodiments of the present invention. Numerous modifications and variations in practice thereof are expected to occur to those skilled in the art upon consideration of these descriptions. Those modifications and variations are intended to be encompassed within the claims appended hereto.

The invention claimed is:

1. A method of producing a low-lactose milk protein isolate comprising the steps of:
   providing a starting liquid milk protein concentrate;
   pre-treating the starting liquid milk protein concentrate by ultra-sonication to provide a pre-treated milk protein concentrate; and
   treating the pre-treated milk protein concentrate by diafiltration to provide a calcium depleted low-lactose milk protein isolate.

2. A method according to claim 1, in which the starting liquid milk protein concentrate comprises as a % of dry matter 70-95% protein, at least 1% lactose, and at least 2% calcium.

3. A method according to claim 1, in which the starting liquid milk protein concentrate comprises as a % of dry matter 70-87% protein, 1-6% lactose, and 2.3-4% calcium.

4. A method according to claim 1, in which the calcium-depleted low-lactose milk protein isolate has at least 20% less calcium that the starting liquid milk protein concentrate as a % of dry matter.

5. A method according to claim 1, in which the calcium-depleted low-lactose milk protein isolate comprises less than 0.55% lactose as a % of dry matter.

6. A method according to claim 1, in which the calcium-depleted low-lactose milk protein isolate comprises less than 2% calcium as a % of dry matter.

7. A method according to claim 1, in which the calcium depleted low-lactose milk protein isolate is a milk protein isolate comprising as a % of dry matter less than 0.55% lactose and less than 2% calcium.

8. A method according to claim 7, in which the pre-treated milk protein concentrate is treated by diafiltration to a degree of filtration of at least 80% DF.

9. A method according to claim 1, in which the diafiltration step employs soft water or a dilute salt solution as a diafiltration media.

10. A method according to claim 9, in which the dilute salt solution has a salt concentration of 0.075-0.150M.

11. A method according to claim 1, further comprising a step of drying the calcium-depleted low-lactose milk protein isolate to a powder.

12. A method of producing a low-lactose milk protein isolate comprising the steps of:
   providing a starting liquid milk protein concentrate;
   pre-treating the starting liquid milk protein concentrate by ultra-sonication to provide a pre-treated milk protein concentrate; and
   treating the pre-treated milk protein concentrate by diafiltration to provide a calcium depleted low-lactose milk protein isolate,
in which the calcium depleted low-lactose milk protein isolate comprises more than 90% protein as a % of dry matter.

13. A method of producing a low-lactose milk protein isolate comprising the steps of:
   providing a starting liquid milk protein concentrate comprising as a % of dry matter 70-90% protein, 3-6% lactose and 2.3-4.0% calcium;
   pre-treating the starting liquid milk protein concentrate by ultra-sonication to provide a pre-treated milk protein concentrate; and
   treating the pre-treated milk protein concentrate by diafiltration to provide a calcium depleted low-lactose milk protein isolate,
in which the calcium depleted low-lactose milk protein isolate comprises as a % of dry matter less than 0.55% lactose and less than 2.0% calcium.

* * * * *